United States Patent

Robertson

[15] 3,672,045

[45] June 27, 1972

[54] PROCESS FOR BONDING MAGNETIC HEADS

[72] Inventor: David D. Robertson, Palo Alto, Calif.

[73] Assignee: Surface Technology, Inc., Mountain View, Calif.

[22] Filed: April 29, 1970

[21] Appl. No.: 33,013

[52] U.S. Cl. ....................29/603

[51] Int. Cl. ....................G11b 5/42

[58] Field of Search ....................29/603

[56] References Cited

UNITED STATES PATENTS

| | | | |
|---|---|---|---|
| 3,505,041 | 4/1970 | Bronnes et al. | 29/603 X |
| 3,098,126 | 7/1963 | Kaspaul | 29/603 X |
| 3,246,384 | 4/1966 | Vice | 29/603 |

*Primary Examiner*—Granville Y. Custer, Jr.

*Attorney*—Flehr, Hohbach, Test, Albritton & Herbert

[57] ABSTRACT

A process is disclosed for bonding magnetic heads by forming a low magnetic permeability spacer between pole pieces of a magnetic head. A primary gap material is deposited, preferably by R.F. sputtering, on the pole pieces. A bonding layer is deposited over the primary gap material, also preferably by R.F. sputtering. The thus coated pole pieces are vacuum degassed and heated to a temperature in the range of 150° to 450° C. The bonding layers are then mated and a pressure of from 50 to 100 psi is applied and held between ½ and 4 hours. Any material which has a relatively low magnetic permeability and can be applied by R.F. sputtering or thermal evaporation is suitable for the primary gap material. The bonding layer is formed of either copper, silver, gold or titanium, or any material which produces a good diffusion bond under the above conditions.

10 Claims, 3 Drawing Figures

INVENTOR
DAVID D. ROBERTSON
BY
Flehr, Hohbach, Test, Albritton & Herbert
ATTORNEYS

PROCESS FOR BONDING MAGNETIC HEADS

FIELD OF THE INVENTION

This invention relates to a method of making a magnetic transducer head.

DESCRIPTION OF THE PRIOR ART

The design of magnetic heads for recording and reproducing signals from magnetic recording media such as magnetic tape has received a great deal of attention over the years. This attention is due to the increased use of magnetic heads for providing a transducing action between electrical equipment in a storage medium, such as magnetic tape. For example, magnetic heads are used for recording television signals on magnetic tape and for reading in or out information to a digital computer. As the equipment such as television recorders or digital computers becomes more refined they become capable of operating at increased frequencies. Operation at such increased frequencies is desirable since less tape is used to store a given amount of information and the speed of operation of the digital computer, for example, is increased. However, it has been difficult to increase the frequency of response to magnetic heads.

In general, a magnetic head is comprised of a magnetic circuit which is interrupted in at least one place to provide an "air gap" and may be interrupted at other places due to the method of construction employed. At first, the term air gap was very descriptive in that only air intervened between the surfaces of the magnetic circuit at this point. However, with increasing emphasis on decreasing the width of this air gap, construction has become more difficult. High frequency operation of a magnetic head requires that the gap be very small and that the width of the gap be capable of accurate determination. Further, electromagnetic considerations require that the magnetic surfaces defining the gap be parallel to within small tolerances. The solution to which the art has gone has been the use of spacers made of a material having a relatively low magnetic permeability. Such spacers are placed between magnetic surfaces to accurately control or define the width of the gap.

Another problem associated with a magnetic head is the wear of the head at the gap. Since, for example, a moving magnetic tape contacts the head, the surface of the head is abraded, leading to alterations of the geometry of the gap. Consequently, a hard material should be used for a spacer which would be resistant to abrasion.

The use of a hard, low magnetic permeability material for a spacer is not, however, without problems. The chief problem is bonding the spacer to the magnetic surfaces which define the gap. The prior art is repleat with various methods doing this. One common approach is to fuse the spacer material to the magnetic core. This, however, has the disadvantage of requiring high temperatures, on the order of 900° C or higher, which affect the magnetic properties of the core and make accurate control of the final gap width very difficult. Other approaches include solder or resin bonding or complete epoxy encapsulation of the gap. In another approach a spot pattern is used between the magnetic surfaces to define the width of the gap and fused glass is poured into the space between the spots to join the parts. This also requires high temperatures which are detrimental to the magnetic material due to thermal stresses.

BRIEF SUMMARY OF THE INVENTION

Accordingly, it is an object of this invention to provide a method for bonding magnetic heads in which no fusing or incapsulation is required.

It is a more specific object of this invention to provide a method for bonding magnetic heads in which no high temperatures are employed.

It is another object of this invention to provide a method for bonding magnetic heads in which spacer widths may be accurately controlled.

It is another object of this invention to provide a method for forming a spacer between magnetic surfaces of a magnetic head.

Briefly, according to one embodiment of the invention, a magnetic head is formed of two core halves which have pole pieces adapted to be joined together by a spacer of low magnetic permeability to define a gap. A hard, low expansion primary gap material is deposited on each of the pole pieces in a thickness just less than half of the desired spacing. Subsequently, a second, softer bonding layer is deposited on the primary gap material to make the total layer thickness on each pole piece one-half of the desired spacing. The pole pieces with the primary gap and bonding layers thereon are heated to a relatively low temperature and physically pressed together. Molecular diffusion at the surface of contact produces a true metallurgical bond between the two core halves.

BRIEF DESCRIPTION OF THE DRAWINGS

Additional objects and features of the invention will appear from the following description in which the preferred embodiment is set forth in detail in conjunction with the accompanying drawings in which.

DESCRIPTION OF THE PREFERRED EMBODIMENT

Figure 1:
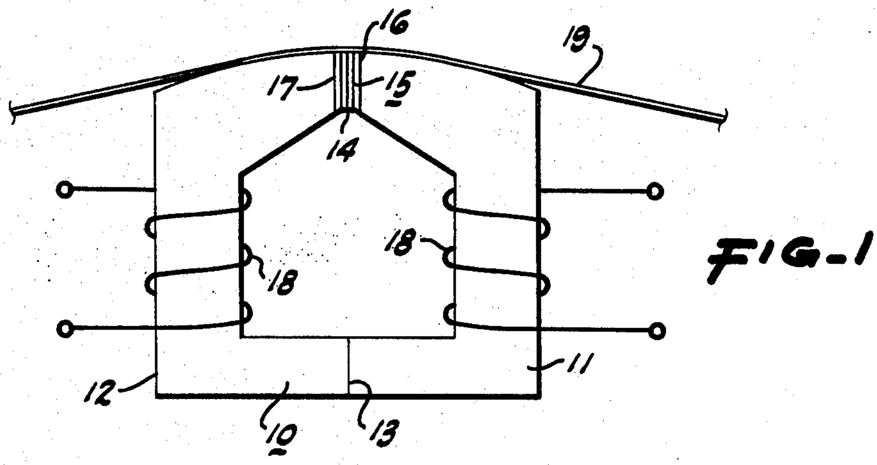
FIG. 1 is a schematic illustration of a typical magnetic transducer unit constructed in accordance with the principles of this invention.

Referring now to the drawings and in particular to FIG. 1, there is shown a magnetic head 10 which has a magnetic core comprised of two core halves 11 and 12. The core halves 11 and 12 are made of a suitable magnetic material which may, for example be ferrite. The core halves 11 and 12 may be constructed in any suitable configuration or shape but are shown in FIG. 1 as being generally U-shaped. The U-shaped core halves 11 and 12 are joined together at a rear gap 13 and a front gap 14 to form the generally symmetrical magnetic head 10 shown in FIG. 1. The method of joining the core halves 11 and 12 at the front gap 14 is the subject of this invention and is more fully discussed hereinafter. In FIG. 1 the core halves 11 and 12 are shown as joined together at the rear gap 13 without the use of a spacer, although it is certainly within the scope of this invention to join the core halves 11 and 12 at the rear gap through the use of the spacer. A spacer is always used at the front gap 14 and a spacer constructed in accordance with the principles of this invention and generally indicated by reference numeral 15 is shown disposed in the gap 14 formed between pole faces 16 and 17 of core halves 11 and 12 in FIG. 1. Coils 18 are disposed on the core halves 11 and 12 and a magnetic medium such as a tape 19 is in contact with the magnetic head 10 at and adjacent front gap 14 and is adapted to be moved by means not shown, with respect to the magnetic head 10.

During a recording function, the signal to be recorded energizes the coils 18 and the magnetic flux within the core halves 11 and 12 varies in accordance with the energization of coils 18. The varying magnetic flux extends through the gap 14 in which the spacer 15 is disposed and a portion of the flux extends above the gap 14 and through the magnetic recording medium 19. In this manner a record is made of the signal of the magnetic recording medium 19.

Conversely, during a playback function, the medium 19 has a signal magnetically recorded thereon and, as in recording, is moved relative to the gap 14. The recorded signal on the medium 19 appears at portions of the medium magnetized to varying degrees. As the medium 19 moves past the gap 14, the core halves 11 and 12 provides a high permeability path for the flux generated by the magnetomotive force of the small section of medium spanning the gap. The magnetic flux in the core halves 11 and 12 thus is changed in value or modulated, and a signal is generated in response thereto in the coils 18.

Figure 2:
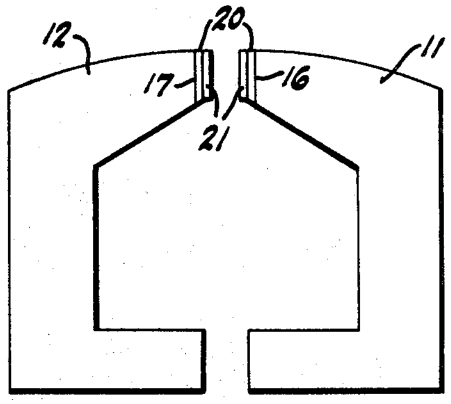
FIG. 2 is a schematic illustration of the two core halves of a magnetic transducer unit with primary gap and bonding layer materials deposited thereon in accordance with the principles of this invention.

Referring now to FIG. 2, there is shown the two core halves 11 and 12 with pole pieces 16 and 17. The first step in a method according to the present invention is insuring that the pole faces 16 and 17 are clean. Cleaning procedures vary for the various types of magnetic materials of which core housing 11 and 12 may be constructed. Suitable cleaning procedures are well known in the art and consequently will not be discussed here. After it is insured that the faces 16 and 17 are clean a primary gap material 20 which comprises a hard, low-expansion material is deposited on each of the pole faces 16 and 17 to a depth slightly less than half of the desired final spacing for the gap 14. The primary gap material 20 is preferably deposited by R.F. sputtering, a technique well known in the art. Alternatively, the primary gap material 20 may be deposited by thermal evaporation, but as indicated R.F. sputtering is the preferred method. Primary gap materials show superior adhesion when applied by R.F. sputtering and the range of material possibilities is virtually unlimited. The only requirements for the primary gap material are that it be capable of being applied either by R.F. sputtering or thermal evaporation and that it has a relatively low magnetic permeability. Suitable materials which may be used for this primary gap material 20 include molybdenum, tungsten, silicon nitride, alumina, tantalum, tantalum nitride, silicon monoxide, and various glasses or metal-ceramic combinations. Since so many materials satisfy the requirements for the primary gap material 20, the above list is not intended to be exhaustive of suitable primary gap materials. The thickness of the primary gap material may be from 5 to 150 micro-inches. Adhesion problems limit how thick the primary gap material may be and coverage and the ability to measure it limit how thin it may be.

After the primary gap material 20 has been deposited, a bonding layer 21 of a material softer than the primary gap material 20 is deposited over the primary gap material 20, as shown in FIG. 2. Materials which are suitable for bonding layers 21 include copper, silver, gold and titanium. The bonding layers 21 are also preferably deposited by R.F. sputtering, but may also be deposited by thermal evaporation. The bonding layer on each of the pole pieces should be from 500 to 1,000 A. units thick. Preferably, both the deposition of the primary gap material 20 and the deposition of the bonding layers 21 are sequentially performed without removal from a deposition chamber or system.

Figure 3:
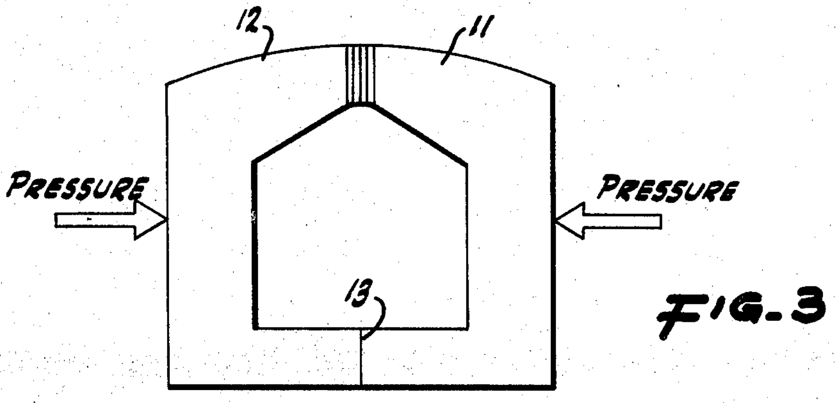
FIG. 3 schematically illustrates the manner in which the two core halves as of FIG. 2 are joined to create a unitary magnetic head.

Referring now to FIG. 3, the core halves 11 and 12 with the primary gap material 20 an the bonding layers 21 deposited thereon are kept in an environment where they will stay clean, such as an oil-free vacuum chamber. The two core halves 11 and 12 are then placed in registration in a vacuum chamber with the bonding layers 21 face to face but not touching. A spacing of 0.001 inch, for example, has been found to be adequate and a vacuum of from 10–8 Torr to 10–10 Torr is adequate. The entire vacuum system including the core halves 11 and 12 with their deposited materials is then heated to a temperature of from 150° to 250° C. This temperature is held for a period sufficient to permit vacuum degassing the core halves 11 and 12, primary gap material 20 and bonding layers 21. In practice, a period of 12 hours has been found to be adequate for this vacuum degassing. Then the core halves 11 and 12 with their deposited primary gap material 20 and bonding layers 21 are heated to a temperature of from 150° to 450° C. The two core halves 11 and 12 are then mated through their bonding layers 21 and are pressed together with a pressure of from 50 to 1,000 psi, depending upon the bonding layer materials selected and the magnetic material of the core halves 11 and 12. This pressure is maintained for between ½ to 4 hours, after which the core halves 11 and 12 with their deposited materials are allowed to cool. Molecular diffusion between the bonding layers 21 produces a true metallurgical bond due to the elevated temperature and the pressure applied thereto, and a unitary magnetic head with an integral spacer of low magnetic permeability results.

The core halves 11 and 12 may also be joined at the rear gap 13 and can be joined through the use of a bonding layer as discussed above with respect to the front gap 13. Alternatively, in what is the preferred embodiment, the core halves 11 and 12 are joined at the back gap 13 by molecular diffusion, therebetween at the elevated temperature and pressure.

For some applications a bonding layer 21 which is separate and distinct from a primary gap 20 is not necessary. Thus if copper, gold or silver is used for the primary gap material, a separate bonding layer is not necessary. That is, the primary gap material 20 will bond to each other by molecular diffusion when subjected to the temperatures and pressures aforesaid.

By way of a specific example, a magnetic head having superior properties results when molybdenum is R.F. sputtered onto the pole faces of ferrite core halves as a primary gap material. The molybdenum primary gap material is then coated with a bonding layer of gold, also R.F. sputtered. The assembly is then heated to 200° C and held at that temperature for 12 hours. The core halves are then pressed together with a pressure of 600 psi and this pressure is held for 2 hours. By way of another specific example molybdenum can be used for a primary gap material with copper deposited on one side and silver on the other side as the bonding layers. For this combination a temperature of 150° C suffices and a pressure of 200 psi which is held for 2 hours is satisfactory.

With the method of this invention control of the final width of the gap is limited only by the ability to measure the deposited primary gap material and bonding layers. In practice, on gaps of between 50 and 100 micro-inches the total width of the gap can be held to plus or minus 2 micro-inches. On thinner gaps between 10 and 50 micro-inches the total width of the gap can be held to a tolerance of within plus or minus 0.5 micro-inches. Thus it can be seen that a method as described in accordance with the present invention enables very accurate control of the final width of the gap.

Although the invention has been described with reference to particular embodiments thereof, it will be obvious to those skilled in the art that certain modifications and changes may be made to the method in accordance with the present invention without departing from the true nature and spirit of the invention.

What is claimed as new and is desired to be secured by Letters Patent of the United States is:

1. In a method for making magnetic transducer heads wherein first and second pole faces of a magnetic core are separated by and joined together through a spacer, an improved method of making the spacer comprising the steps of:

a. depositing a primary gap material on each of the first and second pole faces;
b. depositing bonding layers on the primary gap materials;
c. heating the first and second pole faces with the primary gap material and bonding layers thereon to a temperature within the range 150° to 450° C; and
d. joining the first and second pole faces through the primary gap material and the bonding layers by mating the bonding layers in a vacuum and applying a pressure thereto within the range 50 to 1,000 psi.

2. The method of claim 1 including a step of holding the first and second pole faces with the primary gap material and bonding layers thereon at a temperature within the range 150° to 250° C and a vacuum within the range 10–7 Torr to 10–11 Torr to permit vacuum degassing of the first and second pole faces and the primary gap material and bonding layers.

3. The method of claim 1 wherein the primary gap material and the bonding layers are deposited by R.F. sputtering.

4. The method of claim 1 wherein in said joining step the pressure is applied for a period between ½ and 4 hours.

5. The method of claim 1 wherein the primary gap material is selected from the group consisting of molybdenum, tungsten, silicon nitride, alumina, tantalum, copper, gold, tantalum nitride, silicon monoxide, silver, glasses and metal-ceramic combinations.

6. The method of claim 5 wherein the bonding layers are selected from the group consisting of copper, silver, gold and titanium.

7. The method of claim 6 wherein the primary gap material and the bonding layers are deposited by R.F. sputtering.

8. The method of claim 7 wherein the primary gap material is deposited to a thickness within the range 5 to 150 micro-inches.

9. The method of claim 8 wherein the bonding layer is deposited to a thickness within the range 500 to 1,000 A. units.

10. The method of claim 9 wherein said joining step takes place in a vacuum of at least 10–8 Torr.

* * * * *